Figure 1:
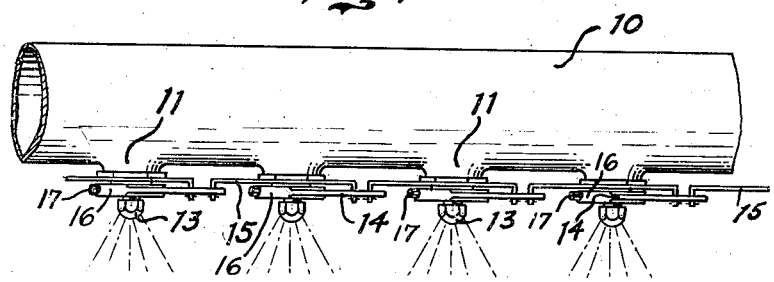

Feb. 15, 1949.                    J. L. WATERS                    2,461,617
                                ROTARY BALL VALVE
                              Filed July 31, 1944

INVENTOR.
JOHN L. WATERS.
BY
W. H. Atkinson
ATTORNEY

Patented Feb. 15, 1949

2,461,617

UNITED STATES PATENT OFFICE 2,461,617

ROTARY BALL VALVE

John Landon Waters, Salem, Oreg., assignor, by mesne assignments, to Carl F. Gerlinger, Dallas, Oreg.

Application July 31, 1944, Serial No. 547,353

6 Claims. (Cl. 251—132)

1

The present invention relates to valves of the so-called ball type, and more specifically to a ball-type valve that is particularly suited for use with a spray bar such as is used to control the flow of a road surface treating oil or other liquid to a nozzle carried thereby.

In work of this character the road treating liquids, which are generally of a bituminous or viscous character, are applied in a heated condition, and since these liquids tend to gum up when cooled, it is important that any valve used to control the flow of same should be of a construction which will operate successfully under these conditions. It is, therefore, a principal object of the present invention to provide a ball-type valve that will have a minimum number of parts and which will be free of cavities and/or recesses into which the liquid might accumulate and render the valve inoperative.

Another object of the invention is to provide a valve for controlling the flow of a viscous liquid from the spray bar of a road surface oiling or treating machine in which the liquid flow controlling elements of the valve are located not materially lower than the interior bottom surface of the spray bar.

Another object of the invention is to provide a ball valve of novel construction in which the valve is formed of a minimum number of parts that are arranged and adapted to be held together and in cooperating relation under all conditions of operation by a single spring means that also serves to position a ball valve in cooperating relation with a movable and ported valve member.

Another object of the invention is to provide a ball valve of novel construction upon which a spray nozzle may be directly mounted and to which an operating lever may be attached and adjusted independently of the opened and closed positions of the valve in such a manner that any number of the valves may be controlled simultaneously from a single operating means.

Other objects and advantages of the invention will be in part evident to those skilled in the art, and in part pointed out hereinafter in the following description taken in connection with the accompanying drawing, wherein there is shown by way of illustration and not of limitation a preferred embodiment of the invention.

In the drawing:

Figure 1 is a side elevation showing a portion of a spray bar as equipped with a plurality of ball valves of the type contemplated by the invention,

2

Figure 2:
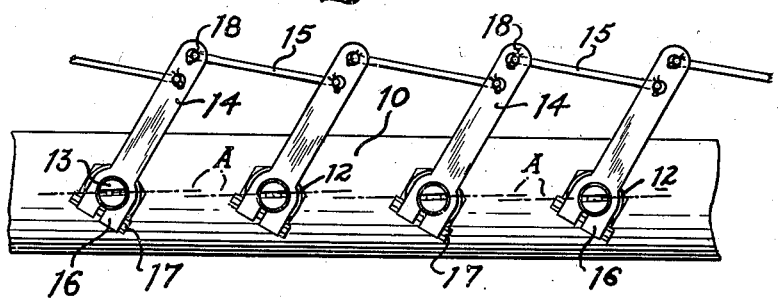
Figure 3:
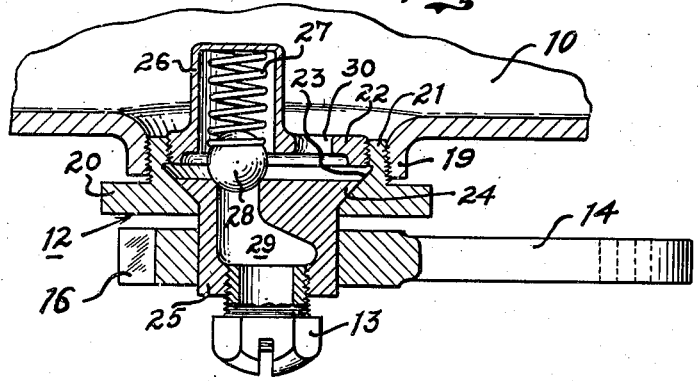
Figure 4:
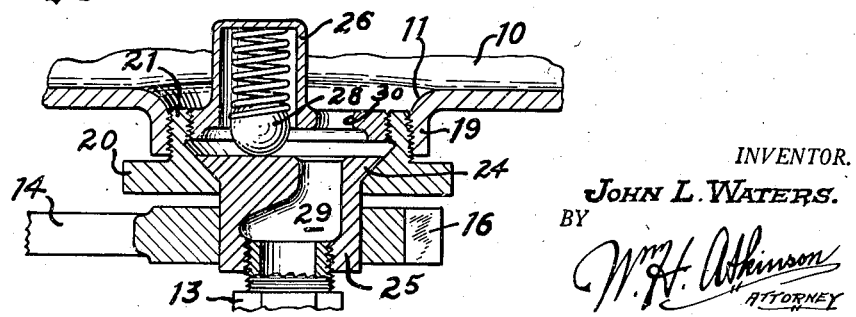

Figure 2 is a view looking at the bottom of the spray bar as shown in Figure 1 of the drawing, Figure 3 is a fragmentary sectional view showing details of my improved valve with the parts arranged in a valve closed position, and Figure 4 is a view similar to Figure 3 showing the valve parts in a valve opened position.

Reference is now made to Figures 1 and 2 of the drawing for a more detailed description of the invention. In these showings the numeral 10 designates a short length or portion of a spray bar, such as is usually suspended at the rear and transverse to the chassis of a tank truck for the purpose of distributing a surface treating material of bitumen, such as asphalt, tar and the like, upon a highway. The spray bar 10 is shown as provided with a plurality of valve accommodating outlets 11 into which individual valves 12 that carry spray nozzles 13 are mounted. As is more clearly shown in Figure 2, each of the valves 12 is adapted to be operated by a control lever 14 that extends outwardly therefrom and between the ends of which there is a series of connecting links 15. With this arrangement the series of links 15 are adapted to be connected with a suitable operating lever located at a point along the spray bar 10, and in this way all of the valves 12 can be operated simultaneously and thus effect a uniform discharge of the road surface treating liquid through the nozzles 13. In their preferred form the nozzles 13 are of a type that will produce a fan-like spray of the liquid and when positioned in accordance with the invention, these fan-like sprays will be disposed at a slight angle to the axis of the spray bar 10, as shown by dot and dash lines "A" in Figure 2 when the valves 12 are open. This will result in an overlapping of the sprays at their points of contact with a road surface and, as the valves 12 are operated to their closed positions, these fan-like sprays will be turned in a counterclockwise direction, as viewed in this figure of the drawing, and thus effect a substantially uniform cut-off or finish line when the spraying operation is to be discontinued. At this point it should also be noted that each of the operating levers 14 is connected to their respective valves 12 by means of a clamp or bifurcated end 16 that is adapted to be adjustably secured to an operating part of the valve by means of a bolt 17. These operating levers 14 are also here shown as provided with individually removable coupling links 15, any one of which may be removed, and in this way any number of the valves 12, at either end of the spray bar 10, may be rendered inoperative by merely removing one of the connecting links 15 at the point where the width of the surface to be sprayed may dictate. It will be understood that the coupling links 15, between the operating levers 14, may take many forms, but they should be connected at their ends to the operating levers 14 so that they may be individually removed in a convenient manner. As here shown these connecting links 15 each have downwardly depending portions that project through spaced holes formed in the ends of the operating levers 14, and at their ends they may carry cotter pins 18 which will serve to retain the links against accidental displacement.

Upon referring now to Figures 3 and 4 of the drawing it will be seen that the valve accommodating outlets 11 of the spray bar 10 may be formed by flanging the bottom wall of the spray bar 10 outwardly so as to provide a plurality of internally threaded valve accommodating extensions 19 at spaced points along the bottom of the spray bar. In its preferred form the valve 12 comprises an externally threaded collar or valve body 20 which has an internally threaded end 21 into which a compression spring retaining member 22 is mounted. At its other end the collar or valve body 20 is provided with a conical or shouldered valve member seating outlet 23 into which a shouldered or enlarged conical end 24 of a cylindrical valve seat member 25 is adapted to be seated. The spring retaining member 22 has an inverted cup-like receptacle 26 in which a compression spring 27 is disposed, and at its outer end this spring 27 engages a spherical ball 28 that is adapted to register with the inner end of a conduit 29 that extends through and terminates in a position eccentric to the axis of the valve seat member 25. In this arrangement the cup-like receptacle 26 of the spring retaining member 22 is likewise disposed eccentric to the axis of the valve seat member 25, and adjacent thereto the spring retaining member 22 is provided with one or more ports 30 through which the spraying liquid may flow from the interior of the spray bar 10 to the conduit 29 of the valve seat member 25. In these figures of the drawing the valve control lever 14 is shown as secured about the extending end of the cylindrical valve seat member 25 into which the spray forming nozzles 13 are centrally threaded. This makes a very desirable arrangement as it will permit of an unlimited radial adjustment of the control levers 14 with respect to the operating positions of the individual valves 12 and, as a result, it will be possible to obtain an adjustment that will insure a substantially simultaneous operation of all of the valves 12 by a simple movement of the main control lever.

When in operation, it will be seen that with the valve 12 closed, as shown in Figure 3 of the drawing, the spherical ball 28 will be biased into a valve closing position over the eccentric inner end of the conduit 29 formed in the valve seat member 25. Under these conditions the ball 28 will close the inner end of the conduit 29 and, as a result, the flow of liquid from the interior of the spray bar 10 through the ports 30 and to the conduit 29 will be cut off. At the same time it will be seen that the compression spring 27, operating upon the ball 28, as here shown, will also serve to bias the enlarged conical end 24 of the cylindrical valve seat member 25 into liquid-tight engagement with the conical valve seat 23 that is formed within this end of the collar or valve body member 20, while the cylindrical valve seat member 25 will be free for a turning about its axis by the lever 14 whenever it is desired to open the valve and permit a flow of liquid therethrough. When this latter operation is completed, the lever arm 14 will be swung over into its other position, as shown in Figure 4 of the drawing, and the cylindrical valve seat member 25 will be turned within the externally threaded collar or valve body member 20 so as to move the inner eccentric end of the conduit 29 out of register with the ball 28 and provide a free open passage for the flow of liquid from the interior of the spray bar 10 through the ports 30 of the spring retainer 22 and the conduit 29 to the fan-like spray producing outlet of the nozzle 13.

With the above described construction it will be seen that I have provided a novel type of ball valve and one which, when combined with a nozzle as shown, will be found particularly adapted for use with the spray bar of highway oiling or spraying apparatus. The valve is also formed of a minimum number of parts that are held together in a novel manner and may be conveniently dismounted and taken apart for a flushing or cleaning, should this become necessary, and while I have, for the sake of clearness and in order to disclose the invention so that the same can be readily understood, described and illustrated a specific device and arrangement, I desire to have it understood that the invention is not limited to the specific form disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In a valve for distributing liquids, the combination of a valve supporting collar adapted to be connected to a source of liquid supply, said valve supporting collar having a shouldered central opening extending therethrough, a rotatable cylindrical valve seat member extending through and engaging the shoulder of said collar and having a fluid conduit terminating at one end eccentric to the axis of said valve seat member, a spring retaining member carried by said valve supporting collar, an eccentrically disposed spring carried by said retaining member, and a ball interposed between said spring and said valve seat member, the said spring being adapted to position said ball and close the conduit through said latter member when in one position and at all times bias the shoulder of said rotatable cylindrical valve seat member into sealing relation within the shouldered central opening of said valve supporting collar.

2. In a valve for distributing liquids, the combination of a threaded valve supporting collar adapted to connect with a source of liquid supply, said valve supporting collar having a conical central opening, a rotatable cylindrical valve seat member having a conical portion seated in the conical central opening of said collar and having a fluid conduit terminating at its inner end eccentric to the axis of said valve seat member, a spring retaining member carried by said valve supporting collar and extending upwardly therefrom, an eccentrically disposed spring carried by said retaining member, and a spherical ball interposed between one end of said spring and said valve seat member, the said spring being adapted to position said ball to close the conduit through said latter member when in one position and at all times bias the conical portion of said rotatable cylindrical valve seat member into sealing relation within the conical central opening of said valve supporting collar.

3. In a ball valve, the combination of a conduit having an internally threaded valve accommodating aperture, a threaded collar adapted to be mounted in said aperture, said collar having an internally threaded extension at one end thereof and an opposite internally positioned conical valve seat forming portion at its other end, a compression spring retaining means mounted in the internally threaded portion of said collar, a valve seat member extending out through the other end of said collar and having an enlarged conical portion engaging the conical valve seat forming portion of said collar, said valve seat member having a fluid directing conduit extending therethrough and terminating at its inner end eccentric to the axis of said valve seat member, a lever means for turning said valve seat member within said collar, a spring positioned eccentric to the axis of said valve seat member and carried by said spring retaining means, and a ball valve member positioned between said spring and said valve seat member and adapted to be brought into and out of register with the inner end of the conduit of said valve seat member by an operation of said lever means, the said spring biasing at all times the enlarged conical portion of said valve seat member into sealing relation with the conical valve seat forming portion of said threaded collar.

4. In a ball valve, the combination of a conduit having an internally threaded valve accommodating aperture, a valve body mounted in said aperture, said valve body having an internally threaded portion at one end thereof and an oppositely arranged internal seat forming portion at its other end, a compression spring retaining means mounted in the internally threaded portion of said valve body, a cylindrical valve seat member extending out through the other end of said valve body and having an enlarged portion at its inner end engaging the internal seat forming portion thereof, said cylindrical valve seat member having a fluid conduit extending therethrough and terminating at its inner end eccentric to the axis of said valve seat member, means for turning said valve seat member within said valve body, a compression spring positioned eccentric to the axis of said valve seat member and carried by said spring retaining means, and a spherical ball between said spring and said valve seat member adapted to be brought into and out of register with the eccentric inner end of the conduit of said valve seat member by an operation of the said valve seat turning means, the said compression spring biasing at all times the enlarged portion of said valve seat member into sealing relation with the internal seat forming portion of said valve body.

5. In a rotary ball valve, the combination of a threaded valve supporting collar adapted to be threaded into the wall of a fluid container, said valve supporting collar having a central opening extending therethrough with a conical shoulder formed intermediate its ends, a rotatable valve seat member having a shoulder portion adapted to engage the conical shoulder of said collar and a fluid conduit extending therethrough and terminating at one end eccentric to the axis about which said rotary valve seat member turns, a spring retaining member extending over the inner end of said valve seat forming member, an eccentrically disposed spring carried by said spring retaining member, and a spherical ball interposed between said spring and said valve seat forming member, said spring being arranged and adapted to operate through said spherical ball and bias said valve seat forming member into sealing relation with the conical shoulder of said threaded valve supporting collar and also bias said spherical ball into closing relation with the eccentrically disposed inner end of the fluid conduit therethrough when said valve seat forming member is in its closed position.

6. In a rotary ball valve, the combination of a valve supporting collar adapted to be connected to a source of fluid supply, said valve supporting collar having a central opening with a conical shoulder formed intermediate its ends, a rotatable valve seat member having a conical portion adapted to engage the conical shoulder of said collar and a fluid conduit extending therethrough and terminating at one end thereof eccentric to the axis about which said rotary valve seat member turns, a spring retaining member extending over the inner end of said valve seat forming member, an eccentrically disposed compression spring carried by said spring retaining member, a spherical ball interposed between one end of said spring and said valve seat forming member, said spring being arranged and adapted to operate through said spherical ball and bias said valve seat forming member into sealing relation with the conical shoulder within the opening of said threaded valve supporting collar and also position and bias said spherical ball into valve closing relation with the eccentrically disposed inner end of the fluid conduit of said valve seat forming member, and means at the other end of said valve seat forming member by which it may be turned to move the eccentrically disposed end of its fluid conduit out of and into registering relation with said spherical ball.

JOHN LANDON WATERS.

REFERENCES CITED

The following references are of record in the file of this patent:

UNITED STATES PATENTS

| Number | Name | Date |
| --- | --- | --- |
| 1,652,978 | Enock | Dec. 13, 1927 |
| 2,028,177 | Williams | Jan. 21, 1936 |
| 2,069,153 | Konkle | Jan. 26, 1937 |
| 2,149,660 | Blood, Jr. | Mar. 7, 1939 |
| 2,197,231 | Walker | Apr. 16, 1940 |
| 2,210,559 | Albright | Aug. 6, 1940 |
| 2,257,642 | Orzehowsky | Sept. 30, 1941 |